UNITED STATES PATENT OFFICE.

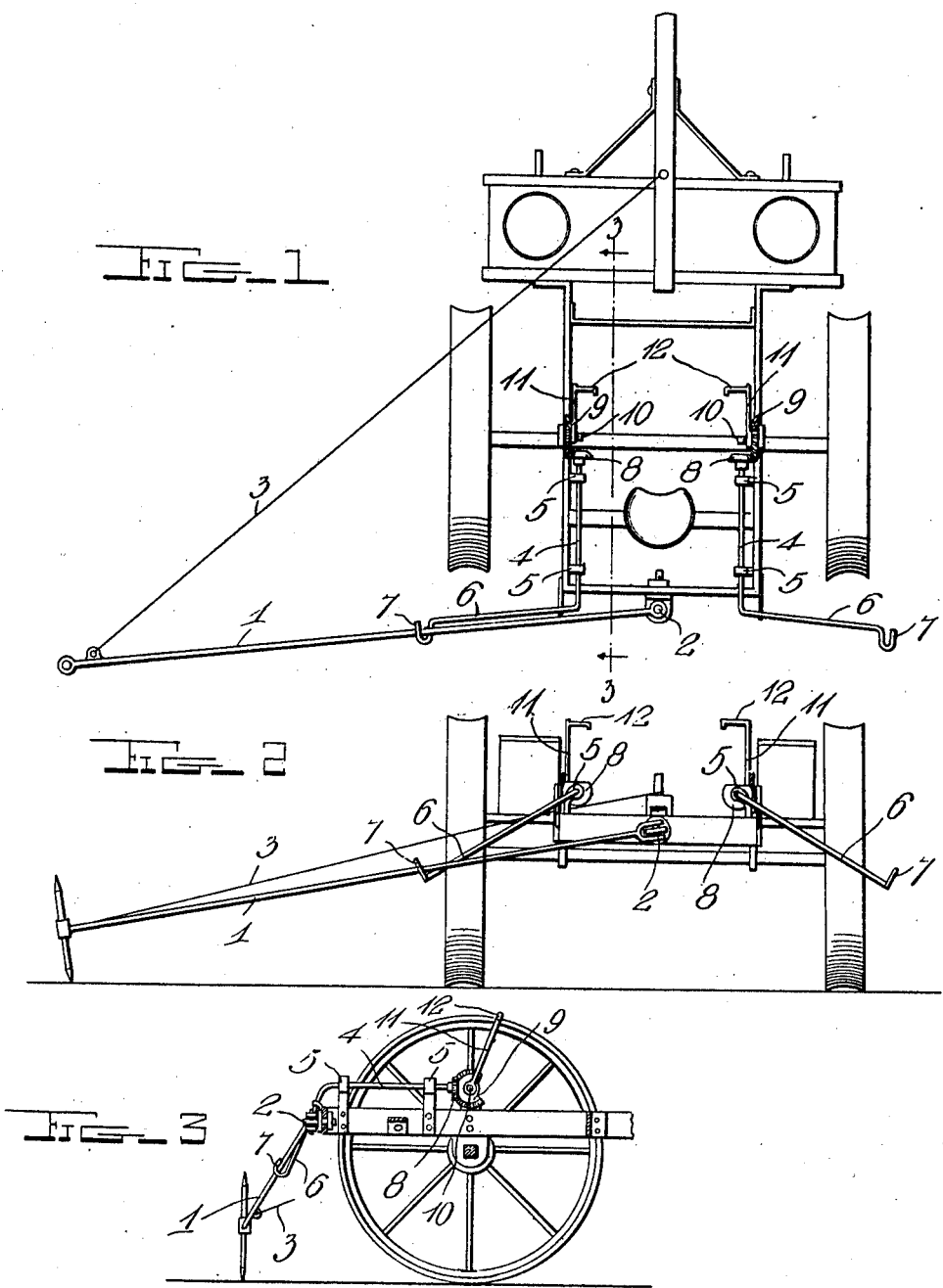

VIRGIL C. BOWSER, OF MONROE, INDIANA.

GAGE-LIFTING ATTACHMENT FOR CORN-PLANTERS.

970,605. Specification of Letters Patent. Patented Sept. 20, 1910.

Application filed July 14, 1910. Serial No. 571,996.

*To all whom it may concern:*

Be it known that I, VIRGIL C. BOWSER, a citizen of the United States, residing at Monroe, in the county of Adams and State of Indiana, have invented certain new and useful Improvements in Gage-Lifting Attachments for Corn-Planters; and I do declare the following to be a full, clear, and exact description of the invention, such as will enable others skilled in the art to which it appertains to make and use the same.

This invention relates to improvements in gage lifting attachments for corn planters.

One object is to provide a gage lifting attachment by means of which the marking gage of corn planters or similar machines may be quickly and easily lifted and swung over to the opposite side of the machine.

Another object is to provide a lifter of this character which will be simple, strong and durable and inexpensive in construction, efficient in operation and which may be attached to any form of planter now in use.

With these and other objects in view, the invention consists of certain novel features of construction, combination and arrangement of parts as will be more fully described and particularly pointed out in the appended claim.

In the accompanying drawings, Figure 1 is a plan view of a portion of a corn planter showing the application of the invention; Fig. 2 is a rear view; and, Fig. 3 is a vertical sectional view taken on line 3—3 in Fig. 1.

Referring more particularly to the drawings 1 denotes the gage bar for marking the position of the next row of seed to be planted, said bar having at its inner end a universal joint connection 2 with the rear end of the machine and midway between the sides thereof as shown. The outer end of the bar 1 is connected by a suitable bracing cord or wire 3 with the tongue or other suitable part of the forward end of the machine as shown.

My improved lifting attachment comprises a pair of rock shafts 4 which are revolubly mounted in suitable bearings 5 secured to the side bars of the planter frame as shown. On the rear ends of the rock shafts 4 are formed crank arms 6 which when swung downwardly project laterally beyond the sides of the machine as shown. On the outer ends of the bars 6 are shown hooks as 7 which are adapted to be engaged with the marking bar 1 for the purpose of operating the same as will be hereinafter more fully described.

On the inner ends of the rock shaft 4 are fixedly mounted beveled segmental gears 8 which are operatively engaged with similar gears 9 revolubly mounted on suitable shafts 10 secured to the frame of the machine. To the gears 9 are connected operating levers 11 which project in a suitable direction and have formed on their outer ends treadles 12 which are adapted to be engaged by the foot of the driver or operator.

By thus arranging the parts it will be readily seen that when one or the other of the levers 4 are pressed downwardly the gear thereon will be operated to rock the shaft 4 geared thereto and thus swing the arm 6 of said shaft upwardly together with the gage bar 1 until said arm has reached an upright position immediately in rear of the driver's seat whereupon after thus being swung up the bar may be readily transmitted to or engaged with the arm 6 and hook 7 of the lifting mechanism on the opposite side of the machine and said mechanism together with the bar lowered to an operative position on the opposite side of the machine, said lowering mechanism being accomplished by the release of the foot from the lever 11 of the operating mechanism on this side of the machine.

It will thus be seen that by means of my lifting attachment the gage marking bar may be readily raised and swung from one side to the other of the machine for marking the row on either side thereof.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

In a gage lifting attachment for corn planters, a marking bar having at its inner end a universal joint connection with the rear end of the planter frame, a bracing bar to connect the outer end of said bar with the forward portion of the planter, a pair of revolubly mounted rock shafts, crank arms formed on the outer ends thereof and adapted to be engaged with said bar, segmental gears fixedly mounted on the inner ends of said rock shafts, a pair of foot levers, segmental gears fixedly secured to said foot levers and having an operative engagement with the segmental gears on said rock shafts whereby the latter are actuated to cause the arms thereon to lift said marking bar.

In testimony whereof I have hereunto set my hand in presence of two subscribing witnesses.

VIRGIL C. BOWSER.

Witnesses:
M. F. PARISH,
C. C. RAYL.